United States Patent
Holmes

(10) Patent No.: US 9,527,499 B2
(45) Date of Patent: Dec. 27, 2016

(54) POWER-SPLIT HYBRID POWERTRAIN USING TURBINE GENERATOR

(71) Applicant: GM GLOBAL TECHNOLOGY OPERATIONS LLC, Detroit, MI (US)

(72) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 14/334,080

(22) Filed: Jul. 17, 2014

(65) Prior Publication Data

US 2016/0016577 A1 Jan. 21, 2016

(51) Int. Cl.

| | |
|---|---|
| B60W 10/06 | (2006.01) |
| B60W 10/08 | (2006.01) |
| B60W 10/115 | (2012.01) |
| B60W 20/00 | (2016.01) |
| B60K 6/445 | (2007.10) |
| B60K 6/448 | (2007.10) |
| B60K 6/52 | (2007.10) |
| B60W 10/02 | (2006.01) |
| B60W 10/196 | (2012.01) |
| F16H 3/72 | (2006.01) |

(52) U.S. Cl.
CPC .............. *B60W 20/10* (2013.01); *B60K 6/445* (2013.01); *B60K 6/448* (2013.01); *B60K 6/52* (2013.01); *B60W 10/02* (2013.01); *B60W 10/06* (2013.01); *B60W 10/08* (2013.01); *B60W 10/196* (2013.01); *F16H 3/725* (2013.01); *F16H 3/728* (2013.01); *F16H 2200/2005* (2013.01); *F16H 2200/2007* (2013.01); *F16H 2200/2035* (2013.01); *F16H 2200/2038* (2013.01); *Y02T 10/6239* (2013.01); *Y02T 10/6265* (2013.01); *Y02T 10/6286* (2013.01); *Y02T 10/6295* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 4,864,151 A | 9/1989 | Wyczalek et al. | |
| 5,558,595 A | 9/1996 | Schmidt et al. | |
| 5,931,757 A | 8/1999 | Schmidt | |
| 6,478,705 B1 | 11/2002 | Holmes et al. | |
| 6,953,409 B2 | 10/2005 | Schmidt et al. | |
| 2007/0068712 A1* | 3/2007 | Carnahan | B60K 6/44 180/65.22 |
| 2011/0021310 A1* | 1/2011 | Kresse | B60W 10/115 477/3 |
| 2012/0329603 A1* | 12/2012 | Yamazaki | B60L 11/14 477/3 |
| 2014/0060045 A1 | 3/2014 | Loveland et al. | |
| 2014/0203760 A1* | 7/2014 | Lammers | H02J 7/007 320/107 |

\* cited by examiner

*Primary Examiner* — Edwin A Young
(74) *Attorney, Agent, or Firm* — Quinn Law Group, PLLC

(57) ABSTRACT

A hybrid powertrain has a turbine generator having a shaft. The hybrid powertrain includes a power-split hybrid transmission that has an input member, an output member, and a ratio-controlling motor/generator controllable to vary a speed ratio of the input member to the output member. The turbine generator is in electrical communication with the ratio-controlling motor/generator to electrically power the ratio-controlling motor/generator when the ratio-controlling motor/generator functions as a motor during a power-split operating mode.

19 Claims, 2 Drawing Sheets

POWER-SPLIT HYBRID POWERTRAIN USING TURBINE GENERATOR

TECHNICAL FIELD

The present teachings generally include a hybrid powertrain for a vehicle that utilizes an exhaust expander and a generator powered by the exhaust expander.

BACKGROUND

Some power-split hybrid vehicles split power from a primary power source, such as an engine, by operatively connecting the power source to a member of differential gearing, such as a planetary gear set. In such an arrangement, different modes of operation are available, including a hybrid operating mode in which the engine is able to operate at or near its most efficient operating speed and torque, while one or more electric motor/generators connected to another member or other members of the differential gearing are controlled to meet vehicle speed and torque demands.

In some such hybrid vehicles, when a motor/generator must operate as a motor to control a member of the differential gearing, it requires electrical power from another power source. Hybrid vehicles with two motor/generators may utilize the other motor/generator to operate as a generator, providing electrical power to power the motor/generator that must operate as a motor. This may create a "power loop" in which energy must be converted from mechanical energy, to electrical energy, and then back to mechanical energy at some point upstream of the general flow of power through the system, with related power losses inherent with the increased conversion and transmission of energy, or a similar situation where the generation of electrical power adds to the load upon the motor/generator that must operate as a motor. In some hybrid configurations, the power loop may be particularly inefficient as it may retard the desired motion of a wheel axle.

SUMMARY

A hybrid powertrain has a turbine generator having a shaft. The turbine generator may be driven by exhaust from an engine. The hybrid powertrain includes a power-split hybrid transmission that has an input member, an output member, and a ratio-controlling motor/generator controllable to vary a speed ratio of the input member to the output member. The turbine generator is in electrical communication with the ratio-controlling motor/generator to electrically power the ratio-controlling motor/generator when the ratio-controlling motor/generator functions as a motor during a power-split operating mode.

In one aspect of the present teachings, the hybrid powertrain has a mechanical point at a predetermined speed ratio of the input member to the output member during an input-split operating mode. During the input-split operating mode, the ratio-controlling motor/generator is controlled to function as a generator at speed ratios of the input member to the output member greater than the predetermined speed ratio at which the mechanical point occurs, and is controlled to function as one of a motor and a brake powered by the generator at speed ratios of the input member to the output member less than or equal to the predetermined speed ratio at which the mechanical point occurs. For example, in a power-split hybrid vehicle that has an input-split operating mode with a mechanical point, the ratio-controlling motor/generator must operate as a motor at speed ratios less than the speed ratio at which the mechanical point occurs. The turbine generator can be utilized to partially or completely power the ratio-controlling motor/generator under such operating conditions, so that reliance on another motor/generator, with the associated power-loop, is reduced or eliminated.

The hybrid vehicle may be an all-wheel drive, power-split hybrid vehicle that has the output member drivingly connectable to a first drive axle, and an additional motor/generator drivingly connected to a second drive axle and mechanically separated from the first drive axle. In such an embodiment, the electronic controller controls the ratio-controlling motor/generator and the additional motor/generator to function as motors in an all-wheel drive operating mode. The turbine generator provides electrical power to the ratio-controlling motor/generator during the input-split operating mode, mitigating or eliminating the need for the additional motor/generator to function as a generator, thereby mitigating or eliminating a "through the road" power loop in which the additional motor/generator would need to retard forward motion of the second drive axle in order to generate electrical power.

In another aspect of the present teachings, the hybrid powertrain may be a compound-split hybrid powertrain, such as, but not limited to, a two-mode hybrid powertrain having an input-split mode and a compound-split mode. The hybrid powertrain has a mechanical point at a predetermined speed ratio of the input member to the output member at which a shift from an input-split operating mode to a compound-split operating mode may be performed, and another mechanical point at another predetermined speed ratio of the input member to the output member in the compound-split operating mode. In the compound-split operating mode both of two motor/generators connected to different gear members act together to control the speed ratio of the input member to the output member at speed ratios within the range between the two mechanical points. In the compound-split operating mode, at least one of these two motor/generators acts as a motor to transmit mechanical power from the input member to the output member. The turbine generator provides electrical power to the motor/generator that is acting as a motor during the compound-split operating mode. This mitigates or eliminates the need for the additional motor/generator to power the motor/generator that is acting as a motor. The two motor/generators act in opposition to one another at speed ratios in the compound-split operating mode outside of the range between the two mechanical points. A power loop that would otherwise occur at such speed ratios is thus avoided by using the turbine generator to power the motor/generator that is acting as a motor, instead of using the other motor/generator to power the motor/generator that is acting as a motor.

With the greater efficiency provided during a power-split operating mode, the need for a fixed ratio operating mode is reduced, increasing design options for hybrid vehicles.

The above features and advantages and other features and advantages of the present teachings are readily apparent from the following detailed description of the best modes for carrying out the present teachings when taken in connection with the accompanying drawings.

DETAILED DESCRIPTION

Figure 1:
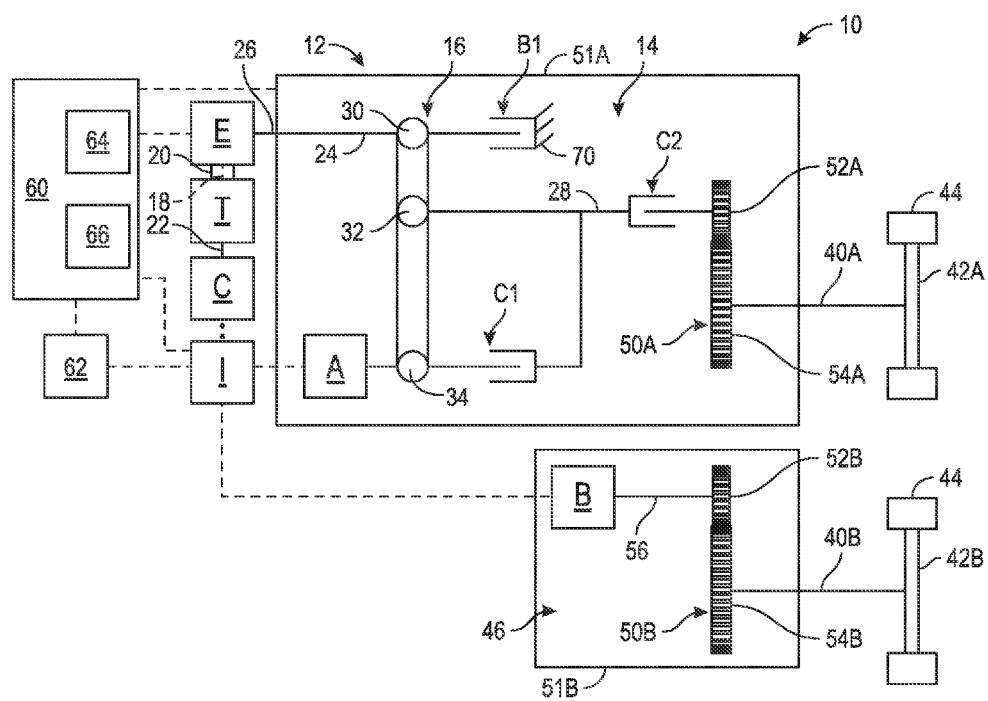
FIG. 1 is a schematic illustration of a vehicle with a hybrid powertrain in accordance with one aspect of the present teachings.

Referring to the drawings, wherein like reference numbers refer to like components, FIG. 1 shows a hybrid vehicle 10 that has a hybrid powertrain 12 with a hybrid transmission 14. The hybrid powertrain 12 includes multiple power sources, including an engine E and a first motor/generator A, which is a ratio-controlling motor/generator in the embodiment of FIG. 1. The hybrid powertrain 12 is configured to provide multiple operational modes including an input-split operating mode in which power is provided both by the engine E and by the motor/generator A at different members of a differential gear set 16. The powertrain 12 utilizes a generator C driven by engine exhaust 18 passing through a manifold 20 to an exhaust expander T to generate electricity. The generator C may be operable only as generator or, in some embodiments, it may be operable as a motor and as a generator, especially if the exhaust expander T is part of an assembly such as a turbocharger with a compressor (not shown).

The exhaust expander T is also referred to as an exhaust turbine. Expansion of the heated exhaust in the exhaust expander T turns turbine blades within the exhaust expander T and a rotatable shaft 22 attached thereto. The rotatable shaft 22 is connected to a rotor of the generator C, which can be controlled to generate electricity when the rotor is turned. The exhaust expander T and the generator C are together referred to as a turbine generator. The generator C is in electrical communication with the motor/generator A. In some operating modes, including the input-split operating mode, the electricity generated by the generator C is used to power the motor/generator A when the motor/generator A is controlled to function as a motor. Utilizing the energy of the exhaust gas to ultimately power the motor/generator A can increase fuel economy. Additionally, as further explained herein, inefficient power loops created when another source is required to power the motor/generator are avoided.

More specifically, the transmission 14 has an input member 24 operatively connectable to a rotatable crankshaft 26 of the engine E. The crankshaft 26 can be continuously connected to the input member 24, or selectively connected by engagement of an engine disconnect clutch (not shown). Moreover, a torsional vibration dampener could be positioned between the crankshaft 26 and the input member 24. The input member 24 is directly and continuously connected for rotation in unison with a first member 30 of the differential gear set 16. As used herein, two components connected or connectable for "rotation in unison" or for "common rotation" rotate together at the same speed when connected.

The transmission 14 also has an output member 28 that is selectively connected for rotation in unison with a second member 32 of the differential gear set 16. The motor/generator A has a rotor continuously connected for rotation in unison with a third member 34 of the differential gear set 16. The arrangement of the engine E and the motor/generator A connected to different members of the differential gear set 16 is a power-split arrangement, which allows the engine E to be operated at a predetermined, efficient operating speed, while the speed of the motor/generator A can be varied to control the speed ratio of the input member 24 to the output member 28 as desired to meet vehicle operating demands. Accordingly, the motor/generator A is referred to as the ratio-controlling motor/generator in the embodiment of FIG. 1.

In one embodiment, the differential gear set 16 is a simple planetary gear set, and the first member 30 is a ring gear member, the second member 32 is a carrier member, and the third member 34 is a sun gear member. As is understood by those skilled in the art, pinion gears mounted for rotation on the carrier member (second member 30) mesh with the first member 30, the ring gear member, and with the third member 34, the sun gear member. Other arrangements of differential gearing between the input member 24 and the output member 28 can be used within the scope of the present teachings, including multiple interconnected differential gear sets.

The vehicle 10 has a first drive axle 40A and a second drive axle 40B. The first drive axle 40A is connected to a first pair of wheels 42A and the second drive axle 40B is connected to a second pair of wheels 42B. Only one wheel of each pair of wheels 42A, 42B is shown. Those skilled in the art will readily understand that a drive axle can include half shafts or axle portions, and a differential to interconnect two wheels, such as two front wheels, or two rear wheels. In one embodiment, the wheels 42A are front wheels, and the wheels 42B are rear wheels. In FIG. 1, the wheels 42A, 42B are shown with tires 44 attached. Each wheel can also have a brake mechanism, not shown, such as a friction disc brake.

The vehicle 10 is a power-split, all-wheel drive hybrid vehicle, as the first axle 40A is connectable to the hybrid transmission 14, and the second axle 40B is connectable to an electric drive module 46. The electric drive module 46 is only in electrical connection with the hybrid transmission 14, as further explained herein. As such, a second motor/generator B included in the electric drive module 46 is drivingly connected to the second drive axle 40B but is mechanically separated from the first drive axle 40A.

The output member 28 is operatively connectable to the first drive axle 40A when a clutch C2 is engaged. The clutch C2 is also referred to herein as a second clutch. Engagement of the second clutch C2 enables torque transmission from the output member 28 to the first drive axle 40A through a torque-multiplying first final drive gearing arrangement 50A. In the embodiment of FIG. 1, the first final drive gearing arrangement 50A has a first gear 52A connected for rotation in unison with the output member 28 when clutch C2 is engaged. The first final drive gearing arrangement 50A also has a second gear 54A that meshes with the first gear 52A and is connected to the first drive axle 40A for rotation in unison therewith. The hybrid transmission 14 and the first final drive gearing arrangement 50A are shown generally packaged within a casing 51A that can be a single casing or multiple interconnected casings.

The electric drive module 46 has a torque-multiplying second final drive gearing arrangement 50B. In the embodiment of FIG. 1, the second final drive gearing arrangement 50B has a first gear 52B connected for rotation in unison with a motor shaft 56 of the motor/generator B. The second final drive gearing arrangement 50B also has a second gear 54B that meshes with the first gear 52B and is connected to the second drive axle 40B for rotation in unison therewith. The motor/generator B is also referred to herein as an "additional motor/generator". The electric drive module 46 and the second final drive gearing arrangement 50B are shown packaged in a casing 51B that can be a single casing or multiple interconnected casings.

The generator C, the motor/generator A, and the motor/generator B are electrically connected with one another through transfer conductors. One or more electronic controllers 60, one or more batteries 62, and one or more power inverters I are operatively connected to the generator C and to the motor/generators A and B.

The electronic controller 60 includes at least one processor 64 that executes one or more stored algorithms 66 based on various vehicle and powertrain inputs, and generates control signals in accordance with the stored algorithms that establish multiple operating modes. The vehicle and powertrain inputs may be sensor signals received from various sensors operatively connected to the vehicle and powertrain. The electronic controller 60 may be configured as a single or distributed control device that is electrically connected to or otherwise placed in hard-wired or wireless communication with each of the engine E, the transmission 14, including the clutches C1, C2 and brake B1 thereof, the drive axles 40A, 40B, the generator C, the motor/generators A and B, the power inverter I, and the battery 62. The transfer conductors may be hard-wired or wireless control link(s) or path(s) suitable for transmitting and receiving the necessary electrical control signals for proper power flow control and coordination aboard the vehicle 10.

The electronic controller 60 includes one or more control modules, with one or more processors 64 and tangible, non-transitory memory, e.g., read-only memory (ROM), whether optical, magnetic, flash, or otherwise. The electronic controller 60 may also include sufficient amounts of random access memory (RAM), electrically-erasable programmable read-only memory (EEPROM), and the like, as well as a high-speed clock, analog-to-digital (A/D) and digital-to-analog (D/A) circuitry, and input/output circuitry and devices (I/O), as well as appropriate signal conditioning and buffer circuitry.

The electronic controller 60 can be a host machine or distributed system, e.g., a computer such as a digital computer or microcomputer, acting as a vehicle control module, and/or as a proportional-integral-derivative (PID) controller device having a processor, and, as the memory, tangible, non-transitory computer-readable memory such as read-only memory (ROM) or flash memory. Therefore, the controller 60 can include all software, hardware, memory, algorithms, connections, sensors, etc., necessary to monitor and control the hybrid powertrain 12. As such, one or more control methods executed by the controller 60 can be embodied as software or firmware associated with the controller 60. It is to be appreciated that the controller 60 can also include any device capable of analyzing data from various sensors, comparing data, and making decisions required to control the hybrid powertrain 12. Moreover, the electronic controller 60 can be configured in different embodiments to include an engine control module, a hybrid control processor, and a motor control processor.

The transmission 14 includes a brake B1, referred to herein as a first brake, that is selectively engageable to hold the first member 30 stationary by grounding the first member 30 to a stationary member 70, such as the transmission casing.

The transmission 14 also includes a first clutch C1 that is selectively engageable to connect the second member 32 for rotation in unison with the third member 34. As is understood by those skilled in the art, when two members of a planetary gear set are connected to one another for rotation in unison, or are both braked, the planetary gear set is locked, and all members thereof rotate in unison at the same speed or, in the case of two braked members, are all held stationary. When clutch C1 is engaged, the input member 24 therefore rotates at the same speed as the output member 28, which is referred to as direct drive, at a fixed speed ratio of 1.0.

Figure 2:
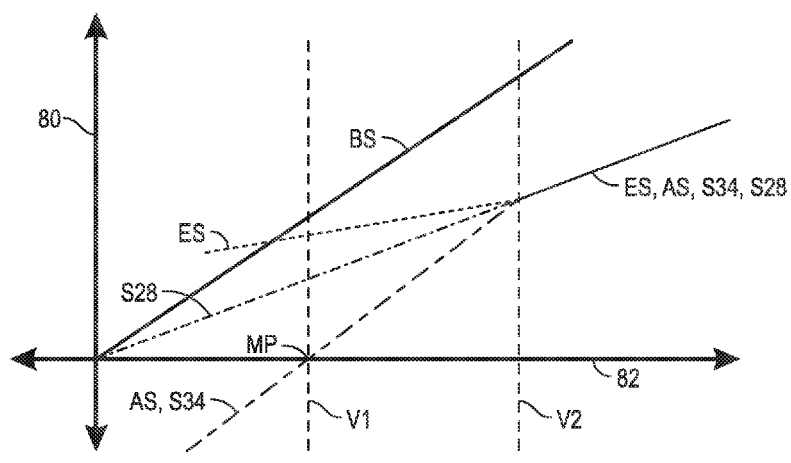
FIG. 2 is a schematic plot illustrating speeds of some of the components of the powertrain of FIG. 1 versus speed of the vehicle of FIG. 1.

The electronic controller 60 establishes a power-split operating mode by controlling the engine E to be on, the second clutch C2 to be engaged, the brake B1 and the first clutch C1 to be disengaged, and motor/generator A to act as a motor or as a generator as necessary to control the speed of the third member 34 to enable the requested torque and speed of the output member 28 while the engine E operates at or near a predetermined efficient engine speed. With reference to FIG. 2, a plot shows speeds of selected components of the hybrid powertrain 12 on the vertical axis 80 versus vehicle speed on the horizontal axis 82. An input-split operating mode is established at vehicle speeds less than speed V2 by operation of the transmission 14 in connection with the additional motor/generator B. The speed of the engine E is represented by curve ES. The speed of the motor/generator A is represented by curve AS. Because the motor/generator A is connected to the third member 34 to rotate in unison therewith, curve AS also represents the speed S34 of the third member 34. Curve BS represents the speed of the motor/generator B. It should be appreciated that the motor/generator B may be operated as a motor during the input-split operating mode, establishing an all-wheel drive, input-split operating mode. At vehicle speed V2, clutch C1 is engaged while clutch C2 remains engaged and brake B1 remains disengaged. The engine speed ES is then equal to the speed S34 of the third member 34 and the speed AS of the motor/generator A. The speed of the output member 28 is represented at curve S28. At low vehicle speeds, such as following vehicle launch, the engine E typically remains off until some vehicle speed, such as but not limited to 25 miles per hour. Because the generator C is not available when the engine E is off, the plots of engine speed ES and the speed AS of motor/generator A are not represented in FIG. 2 at these low vehicle speeds. It should be appreciated that, in all operating modes, the hybrid powertrain 12 also supplies the necessary electrical power for vehicle accessories such as lights, audio system, etc.

During the input-split operating mode, the hybrid powertrain 12 has a mechanical point MP at vehicle speed V1 at which a rotor of the motor/generator A is stationary. The presence of a mechanical point in an operating mode is beneficial inasmuch as the transfer of power from the engine E to the output member 28 does not require the conversion of mechanical power to electrical power in the motor/generator A at the mechanical point—i.e., when the motor/generator A is stationary and using only the electrical power necessary to act as a brake.

At the mechanical point MP, the speed of the rotor of the motor/generator A is zero, and if torque to the input member 24 is applied by the engine E, then the motor/generator A acts a brake, providing reaction torque to the third member 34 of the differential gear set 16. At vehicle speeds less than V1 (i.e., at speed ratios of the input member 24 to the output member 28 greater than the predetermined speed ratio at the mechanical point MP), the electronic controller 60 controls the motor/generator A to function as a generator, allowing the third member 34 to spin backward relative to the direction of rotation of the input member 24, retarding rotation of the third member 34, and absorbing electrical power for the motor/generator B to use when it is commanded to operate as a motor or to be stored in the battery 62. The mechanical point MP occurs when the speed ratio of the input member 24 to the output member 28 is a predetermined speed ratio corresponding with the vehicle speed V1 according to the torque-multiplying ratio of the first final drive gearing arrangement 50A and the engine speed ES at vehicle speed V1. It should be understood that the speed ratio at the mechanical point MP is determined only by the number of teeth on the first and third members 30, 34 of the differential gear set 16, but the exact location of the mechanical point MP along the horizontal axis 82 is determined not only by the number of teeth on the first and third members 30, 34, but also by the rotational speed of the input member 24 (i.e. the engine speed ES). Hence, an increase in the speed of the input member 24 will shift the locations of the mechanical point MP to a higher vehicular speed, and conversely, a reduction in the speed of the input member 24 will shift the mechanical point MP to a lower vehicular speed.

At vehicle speeds greater than V1 (and speed ratios of the input member 24 to the output member 28 less than the predetermined speed ratio at the mechanical point MP), the electronic controller 60 controls the motor/generator A to function as a motor, rotating the third member 34 forward (i.e., in the same direction of rotation as the input member 24), supplying mechanical power to the third member 34 that is converted from electrical power supplied at least in part by the generator C, which, in turn, is supplied by the exhaust energy converted into electrical power by the exhaust expander T. Because exhaust heat is used as the ultimate power source for the motor/generator A during vehicle speeds from V1 to up to but not including vehicle speed V2 in the input-split operating mode, that is, at speed ratios of the input member 24 to the output member 28 in the input-split operating mode and equal to or less than the predetermined speed ratio at the mechanical point MP, the motor/generator B need not be controlled to function as a generator during the input-split operating mode at these speed ratios, and so does not retard forward propulsion of the second drive axle 40B. A power loop that would otherwise require the motor/generator B to retard rotation of the second axle 40B is thus avoided. If electrical power from the battery 62 is used to supply power to the motor/generator A, that amount of power is reduced by the amount supplied by the generator C.

At vehicle speed V2, the first clutch C1 is engaged while clutch C2 remains engaged, thus causing the fixed ratio operating mode so that the engine E, which is controlled to be on, drives the first drive axle 40A at a speed ratio determined by the first final drive gearing arrangement 50A.

The electronic controller 60 can also control the hybrid powertrain 12 to establish a single-axle, electric-only operating mode, or an all-wheel drive, electric-only operating mode, or a single-axle series hybrid operating mode. During the single-axle, electric-only operating mode, the electronic controller 60 controls the engine E to be off, the generator C and the motor/generator A to be off (i.e. unpowered) and the clutch C2 to be disengaged while the motor/generator B operates as a motor using electrical power from the battery 62. During the all-wheel drive, electric-only operating mode, the electronic controller 60 controls the engine E to be off, the generator C to be off, brake B1 to be engaged, clutch C1 to be disengaged, and clutch C2 to be engaged while the motor/generators A and B operate as motors using electrical power from the battery 62. During the single-axle, series hybrid operating mode, the controller 60 controls the engine E to be on, the clutch C1 to be engaged, and the brake B1 and clutch C2 to be disengaged, while the motor/generator A is controlled to function as a generator driven by the engine crankshaft 26 and the generator C is controlled to function as a generator, utilizing the rotating shaft 22 driven by the engine exhaust 18 in the exhaust expander T to generate electrical power provided to the motor/generator B, which is controlled to function as a motor.

FIG. 1 is a power-split hybrid vehicle 10 as mechanical power from the engine E can be split by the hybrid powertrain 12 into power transmitted through differential gear set 16, and first final drive gearing arrangement 50A to a drive axle 40A, and power transmitted through motor/generators A and B to a drive axle 40B. That is, a fraction of the power from the engine E may be converted into electricity by the motor/generator A and supplied to motor/generator B to turn a drive axle 40B. The hybrid powertrain 12 in FIG. 1 includes a ratio-controlling motor/generator A and another motor/generator B geared directly to a drive axle 40B, and is capable of operating in an input-split operating mode, as shown in FIG. 2, wherein the speed AS of the ratio-controlling motor/generator A is a linear combination of the speed ES of the engine E and the speed S28 of the output member 28 (which itself is proportional to vehicle speed) and the speed BS of the another motor/generator B is directly proportional to vehicle speed.

Figure 3:
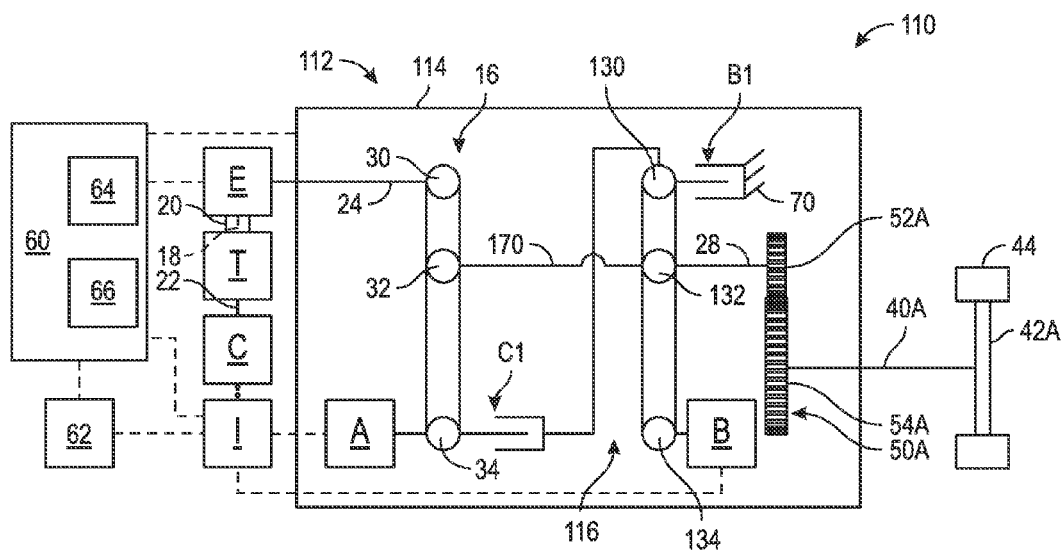
FIG. 3 is a schematic illustration of a vehicle with a hybrid powertrain in accordance with an alternative aspect of the present teachings.

It should be appreciated that the benefits of the use of an exhaust expander T to power a generator C which then powers the motor/generator A to drive the third member 34 during a portion of a power-split operating mode can also be applied to other hybrid vehicle arrangements, such as the hybrid vehicle 110 of FIG. 3. The hybrid vehicle 110 has a hybrid powertrain 112 with a two-mode hybrid transmission 114 driving only one axle 40A. The hybrid transmission 114 includes a second differential gear set 116 having a first member 130, a second member 132, and a third member 134. In one embodiment, the second differential gear set 116 is a simple planetary gear set, and the first member 130 is a ring gear member, the second member 132 is a carrier member, and the third member 134 is a sun gear member.

The first member 130 is selectively connectable for rotation in unison with the third member 34 by selective engagement of first clutch C1. The first member 130 is selectively grounded (i.e., held to the stationary member 70) by engagement of first brake B1. The second member 132 is continuously connected for rotation in unison with the second member 32 by an interconnecting member 170. The second member 132 is also continuously connected for rotation in unison with the output member 28. The third member 134 is connected for rotation in unison with the rotor of the motor/generator B. No electric drive module 46 is provided, and the second axle and the second pair of wheels (not shown in FIG. 3) are not driven.

Figure 4:
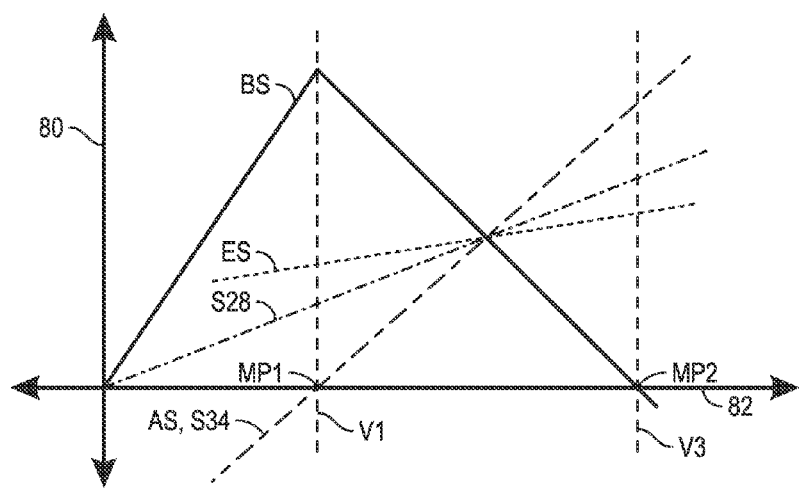
FIG. 4 is a schematic plot illustrating speeds of some of the components of the powertrain of FIG. 3 versus speed of the vehicle of FIG. 3.

The hybrid powertrain 112 is controlled by the electronic controller 60 to establish multiple different operating modes. Two modes of operation of the hybrid powertrain 112 are now described in reference to FIG. 4. FIG. 4 is a plot showing speeds of selected components of the hybrid powertrain 112 on the vertical axis 80 versus vehicle speed on the horizontal axis 82. At low vehicle speeds, such as following vehicle launch, the engine E typically remains off until some vehicle speed, such as but not limited to 25 miles per hour. Because the generator C is not available when the engine E is off, the plots of engine speed ES and the speed of motor/generator A are not represented in FIG. 4 at these low vehicle speeds. It should be appreciated that, in all operating modes, the hybrid powertrain 112 also supplies the necessary electrical power for vehicle accessories such as lights, audio system, etc.

An input-split operating mode is established at vehicle speeds below vehicle speed V1, and corresponding speed ratios of the input member 24 to the output member 28. During the input-split operating mode, the brake B1 is engaged, the clutch C1 is disengaged, and the engine E is on. A first mechanical point MP1 occurs at a first predetermined speed ratio of the input member 24 to the output member 28, which corresponds to the vehicle speed V1 in FIG. 4 given the speed S28 of the output member 28 and the speed ES of the input member 24. At the first mechanical point MP1, the rotor of the motor/generator A is stationary, as indicated by the plot of speed AS of the motor/generator A. At speed ratios greater than the speed ratio at the first mechanical point MP1, that is at vehicle speeds less than V1, the motor/generator A functions as a generator and the motor/generator B is controlled to function as a motor.

A shift from the input-split operating mode to a compound-split operating mode occurs at the first predetermined speed ratio of the first mechanical point MP1 by engaging the clutch C1 and disengaging the brake B1. In the compound-split operating mode, i.e., at speed ratios of the input member 24 to the output member 28 less than the speed ratio at the first mechanical point MP1, the motor/generator A is controlled to function as a motor and the motor/generator B is controlled to function as a generator at speed ratios of the input member 24 to the output member 28 corresponding with the range of vehicle speeds greater than speed V1 and up to but not including speed V3. At a second predetermined speed ratio of the input member 24 to the output member 28 corresponding with vehicle speed V3, a second mechanical point MP2 occurs. At the second mechanical point, the speed of a rotor of the motor/generator B is stationary, as indicated by curve BS having a zero speed value at the second mechanical point MP2. In the embodiment of FIG. 3, either of the motor/generator A and the motor/generator B can be used to control the speed ratio in the compound-split operating mode. Without the use of the battery 62 or the first generator C, and in the absence of other significant electrical loads, the electrical power produced by one of the two motor/generators A and B connected to the differential gear sets 16 and 116 acting as a generator must balance the electrical power consumed by the other of the other of the two motor/generators connected to the differential gear sets 16 and 116 acting as a motor.

During the compound-split operating mode, at speed ratios of the input member 24 to the output member 28 between the mechanical point MP1 and the mechanical point MP2, the motor/generators A and B can work together to control the speed ratio. Both the forward torque applied to the differential gear sets 16 and 116 by the motor/generator A acting as a motor and the retarding torque applied to the differential gear sets 16 and 116 by the motor/generator B acting as a generator provide reaction torque to allow forward torque applied to the input member 24 to result in forward torque applied by the output member 28 to the first gear 52A of the first final drive gearing arrangement 50A. However, at speed ratios of the input member 24 to the output member 28 less than the second predetermined speed ratio occurring at the second mechanical point MP2 (i.e., at vehicle speeds greater than vehicle speed V3 in FIG. 4), the motor/generator B is controlled to operate as a motor, and the motor/generator A cannot act as a generator to provide electrical power to the motor/generator B acting as a motor without opposing the ratio-controlling action of the motor/generator B acting as a motor. The backward torque applied to the differential gear sets 16 and 116 by the motor/generator B acting as a motor in the backward direction of rotation provides reaction torque to allow forward torque to be transmitted from input member 24 to the output member 28, but retarding torque that would be applied to the differential gear sets 16 and 116 by the motor/generator A acting as a generator to supply the motor/generator B would require additional torque from the third motor/generator B, increasing its load and losses. Accordingly, the generator C is instead used to power the motor/generator B to function as a motor at vehicle speeds greater than V3 in FIG. 4, while the second motor/generator A is controlled to freewheel or generate with reduced load, adverse torque, and losses.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A hybrid powertrain comprising:
   a turbine generator having a shaft;
   a power-split hybrid transmission having:
      an input member;
      an output member;
      a ratio-controlling motor/generator controllable to vary a speed ratio of the input member to the output member; and
   wherein the turbine generator is in electrical communication with the ratio-controlling motor/generator to electrically power the ratio-controlling motor/generator when the ratio-controlling motor/generator functions as a motor during a power-split operating mode of the hybrid transmission.

2. The hybrid powertrain of claim 1, wherein the power-split operating mode is an input-split operating mode; wherein the hybrid powertrain has a mechanical point at which the ratio-controlling motor/generator is stationary at a predetermined speed ratio of the input member to the output member during the input-split operating mode; wherein the ratio-controlling motor/generator is controlled to function as a generator at speed ratios of the input member to the output member greater than the predetermined speed ratio of the input member to the output member during the input-split operating mode; and
   wherein the ratio-controlling motor/generator is controlled to function as one of a motor and a brake powered by the turbine generator at speed ratios of the input member to the output member less than or equal to the predetermined speed ratio during the input-split operating mode.

3. The hybrid powertrain of claim 2, wherein the power-split hybrid transmission includes a differential gear set having a first member, a second member, and a third member; wherein the input member is connected to rotate in unison with the first member, the output member is connected to rotate in unison with the second member, and the ratio-controlling motor/generator is connected to the third member for rotation in unison; and further comprising:
   a final drive gearing arrangement
   a first brake selectively engageable to hold the first member stationary;
   a first clutch selectively engageable to connect the second member for rotation in unison with the third member;
   a second clutch selectively engageable to connect the output member to the final drive gearing arrangement;

wherein the first brake and the second clutch are engaged, the first clutch is disengaged, and the ratio-controlling motor/generator is controlled to function as a motor in an electric-only operating mode;

wherein the second clutch is engaged and the first brake and the first clutch are disengaged, and the turbine generator provides electrical power to the ratio-controlling motor/generator which functions as a motor in the input-split operating mode; and wherein the first clutch and the second clutch are engaged, the first brake is disengaged, and the engine is on in a fixed ratio operating mode.

4. The hybrid powertrain of claim 2, further comprising:
a first drive axle and a second drive axle; wherein the output member is drivingly connectable to the first drive axle;
an additional motor/generator drivingly connected to the second drive axle and mechanically separated from the hybrid transmission and the first drive axle;
wherein the ratio-controlling motor/generator and the additional motor/generator function as motors in an all-wheel drive operating mode.

5. The hybrid powertrain of claim 1, wherein the transmission has a differential gear set with a first member, a second member, and a third member; wherein the output member is connected to the second member for rotation in unison; and
wherein the ratio-controlling motor/generator is connected to the third member for rotation in unison.

6. The hybrid powertrain of claim 5, wherein the differential gear set is a second differential gear set; and further comprising:
a first differential gear set having a first member, a second member, and a third member;
wherein the input member is connected to the first member of the first differential gear set for rotation in unison;
a motor/generator connected to the third member of the first differential gear set for rotation in unison;
an interconnecting member continuously connecting the second member of the first differential gear set to the second member of the second differential gear set for rotation in unison;
a first clutch selectively engageable to connect the first member of the second differential gear set with the third member of the first differential gear set for rotation in unison; and
a first brake selectively engageable to hold the first member of the second differential gear set stationary.

7. The hybrid powertrain of claim 6, wherein the first member of the second differential gear set is a ring gear member, the second member of the second differential gear set is a carrier member, and the third member of the second differential gear set is a sun gear member.

8. The hybrid powertrain of claim 6, wherein the power-split operating mode is a compound-split operating mode; wherein the hybrid powertrain has a first mechanical point at which the motor/generator connected to the third member of the first differential gear set is stationary at a first predetermined speed ratio of the input member to the output member; wherein the hybrid powertrain transitions from an input-split operating mode to the compound-split operating mode at the first mechanical point;

wherein the hybrid powertrain has a second mechanical point at which the ratio-controlling motor/generator is stationary at a second predetermined speed ratio of the input member to the output member during the compound split operating mode; and wherein at least one of the motor/generators is controlled to function as a motor powered by the turbine generator functioning as a generator at at least some speed ratios of the input member to the output member less than the second predetermined speed ratio during the compound-split operating mode.

9. A hybrid powertrain for a vehicle comprising:
an engine;
an exhaust expander having a rotatable shaft driven by exhaust from the engine;
a generator connected to and driven by the rotatable shaft of the exhaust expander;
a transmission having a rotatable input member operatively connected to the engine, a rotatable output member, and at least one differential gear set operatively connecting the input member and the output member;
a first motor/generator and a second motor/generator, at least one of which is connected to rotate in unison with a member of said at least one differential gear set;
an electronic controller operatively connected to the engine, to the generator, and to the first and the second motor/generators; and
wherein the electronic controller has a processor that executes a stored algorithm by which the electronic controller controls the generator to function as a generator providing electrical power to one of the first and second motor/generators controlled to function as a motor during a power-split operating mode.

10. The hybrid powertrain of claim 9, wherein the power-split operating mode is an input-split operating mode; wherein the hybrid powertrain has a mechanical point at which the first motor/generator is stationary at a predetermined speed ratio of the input member to the output member during the input-split operating mode; wherein the first motor/generator is controlled to function as a generator at speed ratios of the input member to the output member greater than the predetermined speed ratio during the input-split operating mode; and wherein the first motor/generator is controlled to function as one of a motor and a brake powered by the generator functioning as a generator at speed ratios of the input member to the output member less than or equal to the predetermined speed ratio during the input-split operating mode.

11. The hybrid powertrain of claim 10, wherein said at least one differential gear set has a first member, a second member, and a third member; wherein the input member is connected to the first member for rotation in unison, and the output member is connected to the second member for rotation in unison, and further comprising:
a final drive gearing arrangement;
a first brake selectively engageable to hold the first member stationary;
a first clutch selectively engageable to connect the second member to the third member for rotation in unison;
a second clutch selectively engageable to connect the output member to the final drive gearing arrangement; and
wherein the second clutch is engaged, the first brake and the first clutch are disengaged, the engine is on and the generator functions as a generator providing electrical power to the first motor/generator when the first motor/generator functions as a motor during the input-split operating mode.

12. The hybrid powertrain of claim 11, wherein said at least one differential gear set includes:
a first differential gear set having a first member, a second member, and a third member; and
a second differential gear set having a first member, a second member, and a third member;
wherein the second motor/generator is connected to rotate in unison with the third member of the second differential gear set; and the hybrid powertrain further comprising:
an interconnecting member continuously connecting the second member of the first differential gear set to the second member of the second differential gear set for rotation in unison;
a first clutch selectively engageable to connect the first member of the second differential gear set with the third member of the first differential gear set for rotation in unison; and
a first brake selectively engageable to hold the first member of the second differential gear set stationary.

13. The hybrid powertrain of claim 12, wherein the first member of the second differential gear set is a ring gear member, the second member of the second differential gear set is a carrier member, and the third member of the second differential gear set is a sun gear member.

14. The hybrid powertrain of claim 12, wherein the power-split operating mode is a compound-split operating mode;
wherein the hybrid powertrain has a mechanical point at a predetermined speed ratio of the input member to the output member during the compound-split operating mode; wherein at least one of the first and the second motor/generators is controlled to function as one of a motor and a brake powered by the generator functioning as a generator during the compound-split operating mode at speed ratios of the input member to the output member less than or equal to the predetermined speed ratio.

15. The hybrid powertrain of claim 9, further comprising:
a first drive axle and a second drive axle; wherein the output member is drivingly connectable to the first drive axle;
wherein the second motor/generator is drivingly connectable to the second drive axle and mechanically separated from the first drive axle; and
wherein the controller is operatively connected to the second motor/generator and controls the generator to function as a generator to power the second motor/generator which is controlled to function as a motor to drive the second drive axle when the engine is on in a series hybrid operating mode.

16. The hybrid powertrain of claim 9, wherein the said at least one differential gear set includes a first differential gear set having a first member, a second member, and a third member; wherein the first member is a ring gear member, the second member is a carrier member, and the third member is a sun gear member.

17. A hybrid powertrain comprising:
a first drive axle and a second drive axle;
an engine;
an exhaust expander having a shaft rotatably driven by exhaust from the engine;
a generator rotatably driven by the shaft of the exhaust expander;
a transmission having an input member operatively connected to the engine, an output member, and a simple planetary gear set with a ring gear member, a carrier member, and a sun gear member; wherein the input member is connected to the ring gear member for rotation in unison, and the output member is connected to the carrier member for rotation in unison;
a first motor/generator connected to the sun gear member;
a second motor/generator drivingly connected to the second drive axle and mechanically separated from the engine and the first drive axle;
an electronic controller operatively connected to the generator and to the first and second motor/generators and having a processor that executes a stored algorithm by which the generator is controlled to function as a generator providing electrical power to the first motor/generator which is controlled to function as a motor to drive the sun gear member when the engine is on in an input-split operating mode; and
wherein the generator is controlled to function as a generator providing electrical power to the first motor/generator which is controlled to function as a motor to drive the sun gear member, and the second motor/generator is controlled to function as a motor when the engine is on in an all-wheel drive, input-split operating mode.

18. The hybrid powertrain of claim 17, further comprising:
a final drive gearing arrangement;
a first brake selectively engageable to hold the ring gear member stationary;
a first clutch selectively engageable to connect the carrier member with the sun gear member for rotation in unison;
a second clutch selectively engageable to connect the output member to the final drive gearing arrangement;
wherein the first brake and the second clutch are engaged, the first clutch is disengaged, the engine is off, the generator is unpowered, and the first and second motor/generators are controlled to function as motors in an electric-only, all-wheel drive operating mode;
wherein the second clutch is engaged, and the first brake and the first clutch are disengaged in the input-split operating mode;
wherein the first clutch, the second clutch, and the first brake are disengaged, the engine is off, the generator and the first motor/generator are unpowered, and the second motor/generator is controlled to function as a motor during a single axle, electric-only operating mode; and
wherein the first clutch is engaged, the first brake and the second clutch are disengaged, the engine is on, and the generator and the first motor/generator are controlled to function as a generators providing electrical power to the second motor/generator which is controlled to function as a motor in a series hybrid operating mode.

19. The hybrid powertrain of claim 17, wherein the hybrid powertrain has a mechanical point at which the first motor/generator is stationary at a predetermined speed ratio of the input member to the output member during the input-split operating mode; wherein the first motor/generator is controlled to function as a generator at speed ratios of the input member to the output member greater than the predetermined speed ratio during the input-split operating mode; and wherein the first motor/generator is controlled to function as one of a motor and a brake powered by the generator at speed ratios of the input member to the output member less than or equal to the predetermined speed ratio during the input-split operating mode.

* * * * *

UNITED STATES PATENT AND TRADEMARK OFFICE
CERTIFICATE OF CORRECTION

| | | |
|---|---|---|
| PATENT NO. | : 9,527,499 B2 | Page 1 of 1 |
| APPLICATION NO. | : 14/334080 | |
| DATED | : December 27, 2016 | |
| INVENTOR(S) | : Alan G. Holmes | |

It is certified that error appears in the above-identified patent and that said Letters Patent is hereby corrected as shown below:

Column 10, Line 61, in Claim 3, "a final drive gearing arrangement" should read --a final drive gearing arrangement;--

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*